Patented Oct. 23, 1945

2,387,521

UNITED STATES PATENT OFFICE 2,387,521

METHOD OF MAKING THERMOPLASTIC COMPOSITIONS AND PRODUCTS OBTAINED THEREBY

George D. Martin, Nitro, W. Va., assignor to Monsanto Chemical Company, St. Louis, Mo., a corporation of Delaware No Drawing. Application October 25, 1941,
Serial No. 416,588

28 Claims. (Cl. 260—768)

This invention relates to new thermoplastic products derived from rubbers and to the preparation of the same. More particularly this invention relates to products obtained by treating a rubber with an organic phosphine halide and another material of the type hereinafter disclosed.

Among the objects of the invention are to produce new and useful compositions of matter derived from natural or synthetic rubbers; to produce a product of improved properties utilizing a rubber as a raw material; to extend the usefulness of natural and synthetic rubber and to advance the art. Other and further objects will in part be hereinafter particularly pointed out and will in part be apparent from the following detailed disclosure.

In accordance with this invention it has been found that valuable products are obtained by treating a rubber with an organic phosphine halide and a suitable modifying agent added during the course of the treatment. These agents are found in the final product in substantial proportion but usually in modified form. Thus the most useful modifying agents are products which themselves undergo a change or reaction during the treatment. The preferred class of modifying agents are aromatic polynuclear hydrocarbons. However, other materials as for example materials capable of polymerizing in the presence of acid can be employed. In the case of materials capable of polymerizing or of reacting with themselves during the course of the reaction it is possible that the change is more or less independent of the reaction between the rubber and phosphine halide. However, the chemical changes involved are obscure and are not well understood. It is therefore to be understood that this invention is not limited to any theory as to the chemical function of the modifying agent. Even materials believed to be chemically inert under ordinary conditions as for example paraffin wax have been found to be useful. Of course in such case it should be possible to add the modifying agent after the reaction is complete but better results are obtained by the addition during the course of the reaction.

Among the modifying agents found useful are phenols as for example phenol, naphthol, catechol, amyl phenol and di-amyl phenol; phenolic resins as for example phenol formaldehyde and phenol-ketone resins; polymerizable materials as for example styrene and coumarone indene distillate; hydrogenated cottonseed oil, glyceryl phthalate, sulfurized retene tar, abietic acid and aromatic polynuclear hydrocarbons as for example phenanthrene, naphthalene, anthracene, retene, retene oil and rosin oil. In the case of retene a technical grade formed in the distillation of pine tar oil resulting from the destructive distillation of pine wood or rosin is entirely satisfactory and is preferred.

The organic phosphine halides with which the rubber is treated include aromatic, aliphatic and mixed aromatic aliphatic phosphine halides or mixtures thereof. While phosphine halides having a carbon atom of an organic radical linked directly to the phosphorus are preferred other types may be used. For example the phosphorus may be linked to carbon through oxygen, sulfur, nitrogen and the like. Likewise while chlorides are preferred for reasons of economy it has been found that useful products are produced from the fluorides, iodides and bromides.

As typical examples of organic phosphine halides which may be employed in the preparation of the new plastic materials, may be mentioned the following but the invention is by no means limited thereto: phenyl dichlor phosphine, thiophendichlor phosphine, tolyl dichlor phosphine, 1,3,4 trimethyl phenyl dichlor phosphine, 1,3,5 trimethyl phenyl dichlor phosphine, xylyl dichlor phosphine, biphenyl dichlor phosphine, α-naphthyl dichlor phosphine, tetrahydro naphthyl dichlor phosphine, dichlor phosphine of meta diphenyl benzene, decyl phenyl dichlor phosphine, diethyl amino phenyl dichlor phosphine, dimethyl amino phenyl dichlor phosphine, tertiary butyl phenyl dichlor phosphine, ditolyl chlor phosphine, dixylyl chlor phosphine, tolyl dibrom phosphine, α-naphthyl dibrom phosphine, tolyloxy dichlor phosphine, α-naphthoxy dichlor phosphine, benzyl dichlor phosphine, phosphazobenzol chloride, diphenyl amino dichlor phosphine, thiophenyl dichlor phosphine, anisyl dichlor phosphine, phenetyl dichlor phosphine, meta and para hydroxy phenyl dichlor phosphine, chlor phenyl dichlor phosphine, bromphenyl dichlor phosphine, ethyl phenyl dichlor phosphine, dibenzyl dichlor phosphine, diphenyl methane dichlor phosphine, xylyl dibrom phosphine, xylyl difluor phosphine, dinaphthyl mono chlor phosphine, naphthyl difluor phosphine, ditertiary butyl phenyl mono-chlor phosphine, decyl dichlor phosphine, heptyl dichlor phosphine, heptyl difluor phosphine, decyl difluor phosphine, tolyl di-iodo phosphine, tolyl difluor phosphine, amyl dichlor phosphine, hexyl dichlor phosphine, butyl dichlor phosphine, amyl dibrom phosphine, diamyl mono chlor phosphine, cymyl dichlor phosphine, dicymyl mono chlor phosphine, cymyl dibrom phosphine, cymyl difluor phosphine, retyl dichlor phosphine, retyl dibrom phosphine, retyl difluor phosphine, tetrahydro naphthyl dibrom phosphine and equivalents and analogues thereof.

Since organic phosphine halides are a well known class of compounds reference may be had to the literature for methods of preparing them. However, while the present application is not concerned with the preparation of these intermediates and is not limited thereto, a Friedel-Crafts synthesis offers certain advantages. Thus, the reaction of a phosphorus tri-halide with a suitable hydrocarbon in the presence of a Friedel-Crafts catalyst results in a composition comprising the organic phosphine halide and catalyst and this crude composition may be reacted with a rubber without isolating the organic phosphine halide. However, a certain amount of unreacted ingredients are ordinarily separated before reacting with the rubber. After heating liquid hydrocarbons as for example xylene, toluene or petroleum ether, with a phosphorus trihalide in the presence of anhydrous aluminum chloride there separates after completion of the reaction a top layer which consists essentially of unreacted hydrocarbon and phosphorus trihalide and a small amount of the desired reaction product. The top layer is simply drawn off and reserved for future preparations. The bottom layer contains the desired reaction product together with a small proportion of unreacted materials, and most of the catalyst, probably in the form of a complex organic addition product. It has been found that this crude mixture remaining after separation of the upper layer is admirably suited for reacting directly with a rubber. While the above picture applies where use is made of the proportions of catalyst given in the literature (see Liebig's Annalen, vol. 212, p. 206, 207), it has been found that by increasing the proportion of catalyst the reaction is brought nearer to completion so that eventually no layers separate. The entire reaction mixture may then be reacted with a rubber since the products produced, at least for the purposes of this invention, are equivalent to those described above and in fact appear to be identical in every respect. Alternatively the crude reaction product whether a bottom layer or an entire reaction mixture obtained with a higher proportion of catalyst, may be heated up to distill out unreacted phosphorus trihalide and hydrocarbon. Obviously the resulting products are not weight for weight equivalents of the products just mentioned since they contain a higher proportion of active constituent. They will therefore be hereinafter referred to as "stripped" hydrocarbon phosphine halides. In order to distinguish therefrom the unstripped varieties may be called "crude" hydrocarbon phosphine halides. The generic class of hydrocarbon phosphine halides made from a phosphorus trihalide and suitable hydrocarbon in the presence of anhydrous aluminum chloride, whether "crude" or "stripped," containing most of the catalyst used in the preparations will be identified in the disclosure following and in the attached claims as "technical" hydrocarbon phosphine halides.

The following example illustrates in detail the preparation of a technical hydrocarbon phosphine halide but is not limitative of the invention:

Into a suitable glass or glass lined reaction vessel fitted with a reflux condenser there was charged 600 parts by weight of toluene, 800 parts by weight of $PCl_3$ and 120 parts by weight of anhydrous aluminum chloride. The mixture was heated to refluxing temperature at which temperature it was maintained for about 36 hours. When cool the reaction mixture separated into two portions. The bottom layer amounting to substantially 840 parts by weight was drawn off and either immediately reacted with a rubber or stored in moisture proof containers since tolyl dichlor phosphine and analogous materials hydrolyze to the corresponding acids. However, the presence of small amounts of water during the subsequent reaction with the rubber has no noticeable effect.

When the aluminum chloride was increased to 140 parts in the above procedure, no layers separated.

Obviously, compounds which are normally solids will not separate as an unreacted liquid layer so that the phosphine halides prepared therefrom are preferably extracted from the crude reaction mixture by a suitable solvent such as petroleum ether, and the residue after removal of the solvent is employed as the reactant. Further purification serves no useful purpose. However, the addition of a small proportion of a Friedel-Crafts catalyst, preferably anhydrous aluminum chloride, is desirable in order to promote the reaction with a rubber.

Crude tolyl dibrom phosphine and tolyl di-iodo phosphine can be obtained by substituting $PBr_3$ and $PI_3$ respectively for the $PCl_3$ in the procedure described for crude tolyl dichlor phosphine and reacted with a rubber in the manner hereinafter described in detail. Since $PF_3$ is a gas somewhat different technique must be employed to prepare the organic phosphine fluorides.

In general, the particular apparatus employed, the presence or absence of a solvent, the temperature, time and the like are not critical factors for obtaining products within the scope of this invention and may be varied according to the particular properties sought in the final product. It is, however, essential that the ingredients be brought into intimate and uniform association if it is expected to get reproducible results. To this end use of a solvent like benzene, toluene or carbon disulfide is of considerable benefit. In the absence of a solvent, the phosphine halides as well as many of the modifying agents tend to make the rubber slimy and slippery during the early stages of the reaction. However, an efficient internal type mixer of corrosion resistant material such as stainless steel will give the proper association of the reactants. This may be of the W&P type or modifications thereof but in any case there should be little or no free space above the mixer blades. Use of well broken down rubber further facilitates the reaction. Small amounts of water are usually present in rubber as well as in retene oil and technical retene and since the amounts are more or less variable it is usually desirable to remove the water before starting the reaction as for example by masticating the rubber and retene at 100° C. for a time. A Banbury mixer or even an ordinary rubber mill may be used but in the latter case it is necessary to enclose the rolls and pass a dry gas through the enclosure or to work in a room of controlled low humidity in order to avoid hydrolysis of the phosphine halide. The latter must be added slowly until the slippery stage has passed after which the remainder may be added at a fairly rapid rate. In addition the batch size should be kept well below that which would normally be employed in milling rubber alone. Tight rolls and a small bank both aid the mixing. Once the reactants have been thoroughly mixed so that the mass is homogeneous throughout it may be removed and placed in an ordinary oven to complete the reaction.

In general it is believed that a more efficient and more readily controlled reaction can be had by working in a rubber cement. The preferred operation is to treat the rubber initially with the phosphine halide and after effecting a partial reaction, add the modifying agent and continue the reaction. On the other hand, good results have been obtained by mixing all the ingredients at once or alternatively mixing the modifying agent and phosphine halide and then treating the rubber with the combination.

The following specific examples will illustrate the invention in detail and are to be understood as descriptive and explanatory but not limitative of the invention.

Example I

A rubber cement was prepared by dissolving 100 parts by weight of pale crepe rubber in a suitable solvent as for example benzene. Into the cement so prepared contained in a suitable vessel fitted with a condenser and stirrer there was added substantially 200 parts by weight of technical retene and 100 parts by weight of crude tolyl dichlor phosphine. The mixture was heated and stirred on a hot water bath for about eight hours after which a Liebig type condenser was substituted for the reflux condenser and the solvent removed by distillation. Heating was continued for a short time after distillation had substantially ceased and then live steam was introduced and after a thorough steaming out, the product was washed with water on a rubber mill or preferably on a mill having corrugated rolls or on other equipment adapted for washing tough plastic products. The washed product was dried to constant weight, as for example by milling on a hot mill followed by heating in a vacuum oven. In this manner, substantially 305 parts by weight of a brown rubbery product was obtained. It compounded readily and gave good, although somewhat lazy cures upon heating in a press in the presence of zinc oxide, sulfur and accelerator.

Harder products giving snappy cures are obtained by using lower proportions of retene and initially heating the rubber with the phosphine halide for a short time before adding the retene as illustrated by the following example.

Example II

A rubber cement was prepared by dissolving substantially 100 parts by weight of pale crepe rubber in a suitable solvent as for example carbon bisulfide. To the cement so prepared contained in a suitable vessel fitted with a reflux condenser and stirrer there was added substantially 100 parts by weight of crude tolyl dichlor phosphine. Heat was applied and after heating and stirring for about an hour 100 parts by weight of technical retene was added and the heating and stirring continued for about twelve hours. The solvent was then removed and the residue worked up all substantially as described in Example I. In this manner, 229 parts by weight of a tough brown rubbery product was obtained, which compounded very much like india rubber but possessed useful properties not found in the latter. A vulcanizate prepared from a stock consisting of 100 parts of the plastic, 10 parts zinc oxide, 0.5 part stearic acid and 1.5 parts mercaptobenzothiazole (all parts are by weight) was highly resistant to attack by ozone or solvents. After 72 hours immersion at room temperature, the swelling was 6% by volume in kerosene and 19% by volume in benzene.

In another run the reaction was carried out in a stainless steel mixer in the absence of a solvent. The rubber was first thoroughly masticated in the mixer, the crude tolyl dichlor phosphine added and the mix heated for one hour at 100° C. The technical retene was then added and the reaction continued for eight hours at the same temperature. The product was then washed thoroughly with water and dried to constant weight (214 parts). The dry product was harder than that prepared in a solvent. When used in place of smoked sheets of rubber in a typical formula carrying 40 parts of carbon black, the cured stock exhibited 23% by volume swelling in kerosene and none in lubricating oil after 72 hours immersion at room temperature. It showed no cracking after 6 minutes exposure under stress to ozone.

The substitution of the technical retene by pure retene increases the hardness of the resulting products but obviously increases the cost of the product. Furthermore, cheaper modifying agents may be used where harder products are desired. For example a hard plastic material was obtained by heating substantially 100 parts by weight each of pale crepe rubber and crude tolyl dichlor phosphine for two hours in carbon bisulfide, adding 50 parts by weight of styrene and continuing the reaction for eight hours. In another variation the styrene and crude tolyl dichlor phosphine were heated in carbon bisulfide for two hours, pale crepe rubber added and the reaction continued for eight hours. This procedure resulted in 166 parts by weight of a soft product which compounded readily and was easily moulded. After curing the stock was somewhat harder than a comparable rubber stock.

Example III

This example illustrates the use of hydrogenated cottonseed oil as a modifying agent. Substantially 100 parts by weight of pale crepe and 100 parts by weight of crude tolyl dichlor phosphine were heated at refluxing temperature in carbon bisulfide for one hour, 100 parts by weight of hydrogenated cottonseed oil added and the heating continued for 12 hours. The solvent was removed and the product worked up as described in Example I. The resulting tough rubber product was particularly amenable to handling and compounding and gave good snappy cures when heated in the presence of zinc oxide, sulfur and accelerator.

A product very similar in physical properties was obtained by replacing the hydrogenated cottonseed oil with a phenolic resin. The latter was a cyclohexanone phenol reaction product. Obviously other phenolic resins may be used as modifying agents.

Example IV

Coumarone-indene distillate is an especially valuable modifying agent since products whose physical properties fall approximately between rubber and leather can be obtained. For example, in one typical preparation, 100 parts by weight of pale crepe rubber and 100 parts by weight of crude tolyl dichlor phosphine were heated for about 90 minutes at refluxing temperature in carbon bisulfide, 100 parts of coumarone-indene distillate added and the heating continued for 15 hours. After removing the solvent, and working up substantially as described in Example I there remained 202 parts by weight of a light brown very tough somewhat rubbery product useful as a balata substitute. The substitution of either glyceryl phthalate or naphthalene for the coumarone-indene distillate resulted in a still harder less rubbery product. With these proportions 180 parts by weight of product were obtained in the former case and 160 in the latter case. $\beta$-naphthol was also tried in the same manner and proportion as described for coumarone-indene distillate and a substantial proportion remained in the final product as a modifying agent. 203 parts by weight of rubbery product were obtained.

*Example V*

Substantially 100 parts by weight of crude cymyl dichlor phosphine was added to a carbon bisulfide cement containing 100 parts by weight of pale crepe rubber. The mixture was stirred and heated at refluxing temperature for about 90 minutes, 100 parts by weight of technical retene added and the heating continued for 18 hours. The solvent was then removed and the residue washed and dried all substantially as described in Example I. There was obtained 227.5 parts by weight of a slightly tacky brown rubbery product. A stock was made up comprising 100 parts of this product, 40 parts Gastex, 10 parts zinc oxide, 5 parts sulfur, 3 parts stearic acid, 2 parts pine tar and 1.5 parts mercaptobenzothiazole (parts are by weight) and cured in a press in the usual manner. The cured product was resistant to attack by ozone and showed negligible swelling in lubricating oil after 72 hours immersion at room temperature.

*Example VI*

Substantially 100 parts by weight of crude tolyl dichlor phosphine was added to a carbon bisulfide cement containing substantially 100 parts by weight of guayule. The mixing was stirred and heated at refluxing temperature for about an hour, 100 parts by weight of technical retene added and the stirring and heating continued for twelve hours. The solvent was then removed and the product worked up all substantially as described in Example I to obtain 228 parts by weight of a soft sticky rubbery product.

A similar reaction carried out by substituting neoprene GW for the guayule resulted in 241 parts by weight of a soft sticky rubbery product.

The substitution of balata for the guayule or neoprene GW likewise gives a soft sticky rubbery product.

These sticky viscous rubbery materials have a variety of industrial applications particularly in combination with other gums and resins to increase the tack and in the preparation of adhesives.

*Example VII*

Substantially 100 parts by weight of Midwest whole tire reclaim was suspended in carbon bisulfide, 100 parts by weight of crude tolyl dichlor phosphine added and the charge stirred and heated at refluxing temperature for two hours. 100 parts by weight of technical retene was then added and the reaction continued for 12 hours. The solvent was removed and the residue washed and dried to constant weight substantially as described in Example I to obtain 225 parts by weight of a product softer and more rubbery than the original reclaim. Tube reclaim was reacted in the same manner and found to behave similarly. The product was somewhat harder.

Stocks were compounded comprising:

|  | Stock | |
| --- | --- | --- |
|  | A | B |
|  | Parts by weight | Parts by weight |
| Product from whole tire reclaim | 100 |  |
| Product from tube reclaim |  | 100 |
| Zinc oxide | 10 | 10 |
| Carbon black | 40 | 40 |
| Sulfur | 5 | 5 |
| Stearic acid | 3 | 3 |
| Pine tar | 2 | 2 |
| Mercaptobenzothiazole | 1.5 | 1.5 |

The products compounded and handled better than the reclaims employed as starting materials and cured nicely by heating in a press in the usual manner. The cured products were found to be highly resistant to attack by organic liquids. For example, the A stock showed no measurable increase in volume in gasoline, lubricating oil or light petroleum naphtha after 72 hours immersion at room temperature. The B stock showed no swelling in kerosene under similar conditions.

*Example VIII*

Substantially 100 parts by weight of $\beta$-naphthoxy dichlor phosphine and substantially 3 parts by weight of anhydrous aluminum chloride were added to a carbon bisulfide cement containing substantially 100 parts by weight of pale crepe rubber. The mixture was stirred and heated at refluxing temperature for about one hour, 100 parts by weight of retene (M. P. 98° C.) added and the heating and stirring continued for 20 hours. The solvent was then removed and the product worked up all substantially as described in Example I to obtain 242 parts by weight of a waxy solid.

*Example IX*

A rubber cement was prepared by dissolving 100 parts by weight of pale crepe rubber in a suitable solvent as for example carbon disulfide. Into the cement so prepared contained in a suitable vessel fitted with a reflux condenser and stirring mechanism there was stirred 200 parts by weight of crude naphthyl phosphine dichloride. Heat was then applied and the mixture stirred at refluxing temperature for about an hour, 100 parts by weight of technical retene added and heating continued for 18 hours after which a Liebig type condenser was substituted for the reflux condenser and the solvent removed by distillation. Heating was continued for a short time after distillation had substantially ceased and then live steam was introduced and after a thorough steaming out, the product was washed with water on a mill having corrugated rolls and dried to constant weight as described in Example I. The dry product was soft and tacky.

A similar product resulted from reacting in substantially the same manner, 100 parts by weight of pale crepe rubber, 100 parts by weight of tetra hydro naphthyl dichlor phosphine and 100 parts by weight of technical retene.

*Example X*

Substantially 100 parts by weight of pale crepe rubber were dissolved in carbon bisulfide and a mixture of substantially 9 parts by weight of anhydrous aluminum chloride and 75 parts by weight of tolyl dichlor phosphine (B. P. 115–117° at 8 mm. pressure) added to the cement so prepared. The charge was heated and stirred at refluxing temperature for approximately an hour, substantially 100 parts by weight of retene (M. P. 98° C.) added and heating continued 24 hours. The solvent was then removed and the product worked up all substantially as described in Example I to obtain 210 parts by weight of a white tough rubbery product.

A stock was made up comprising 100 parts by weight of the above product, 20 parts carbon black, 10 parts zinc oxide, 3 parts sulfur, 5 parts whiting, 1.5 parts mercaptobenzothiazole, 3 parts stearic acid and 2 parts pine tar (all parts are by weight). The compound gave a good cure after heating 25 minutes in a press at the temperature of 40 pounds steam pressure per square inch. The cured product lost 0.8% by weight after immersion in lubricating oil for 72 hours at room temperature and showed no cracking after 6 minutes exposure to ozone of a concentration sufficient to crack badly in 3 minutes a similar stock compounded from smoked sheets of rubber.

Example XI

Substantially 100 parts by weight of crude tolyl di-iodo phosphine were added to a carbon bisulfide cement containing 100 parts by weight of pale crepe rubber. The charge was stirred and heated at refluxing temperature for about one hour, 100 parts by weight of technical retene added and heating continued for about 17 hours. The solvent was then removed, the product steamed out, washed and dried all substantially as described in Example I. 211 parts by weight of a rubbery product was obtained.

Example XII

Substantially 150 parts by weight of crude tolyl dibrom phosphine was added to a carbon bisulfide cement containing 100 parts by weight of pale crepe rubber. The charge was stirred and heated at refluxing temperature for about one hour, 100 parts by weight of technical retene added and the heating continued for about 48 hours after which the solvent was removed and the residue steamed out, washed and dried all substantially as described in Example I. The dry product (238 parts by weight) cured in the presence of sulfur, zinc oxide and sulfur to produce a cured stock of about the same hardness as a stock similarly compounded and cured from smoked sheets of rubber. However the resistance of the former to gasoline, lubricating oil, turpentine and other organic liquids was vastly superior. The product obtained by treating rubber with tolyl dibrom phosphine in the absence of retene was only slightly superior to rubber in resistance to organic liquids.

Example XIII

Substantially 100 parts by weight of Hycar (a co-polymer of butadiene and acrylic nitrile) was soaked in a suitable solvent as for example ethylene dichloride, until soft and pliable, 100 parts by weight of crude tolyl dichlor phosphine was then added and the mixture heated to refluxing temperature for about an hour after which 100 parts by weight of technical retene was added and the heating continued for about 12 hours. The solvent was removed, preferably by distillation and the residue steamed out, washed and dried to constant weight all substantially as described in Example I. A very tough, non tacky rubbery product resulted.

Vulcanizable stocks were compounded comprising

|  | Stock | |
|---|---|---|
|  | C | D |
|  | Parts by weight | Parts by weight |
| Hycar | 100 |  |
| Hycar-tolyl dichlor phosphine-retene reaction product |  | 100 |
| Sulfur | 1.25 | 1.25 |
| Zinc oxide | 5 | 5 |
| Stearic acid | 1 | 1 |
| Dibutyl phthalate | 25 | 25 |
| Gastex | 60 | 60 |
| Cyclohexylamino thio benzothiazole | 0.4 | 0.4 |
| Di(benzothiazyl thiol) dimethyl urea | 0.6 | 0.6 |

The stocks so compounded were cured by heating in a press for 25 and 35 minutes at the temperature of 60 pounds steam pressure per square inch. The resistance to organic solvents was determined by immersing strips of the cured products in benzene for 54 hours at room temperature. Ozone resistance was determined by exposing the cured stocks for three minutes to ozone of a concentration which badly cracked a similar stock compounded from smoked sheets of rubber. The results are summarized below:

| Stock | Cure time in mins. | Per cent swelling in— | | Condition after 3 mins. exposure to ozone |
|---|---|---|---|---|
|  |  | Benzene | Lubricating oil |  |
| C | 25 | 23.7 | None | Visible cracking. |
| D | 25 | 1.0 | do | Very very slight cracking. |
| C | 35 | 23.7 | do | Cracking more than 25 min. cure. |
| D | 35 | 1.0 | do | Negligible. |

The above data show that the modified reaction products of copolymers of butadiene and acrylic nitrile and an organic phosphine halide possess resistance to ozone and solvents superior to the original copolymers.

As will be appreciated from the foregoing description and examples a wide variety of rubbers both natural and synthetic are applicable in the process of the present invention. Accordingly the term "a rubber" is employed in the claims to define a vulcanizable plastic material which possesses high extensibility under load coupled with the property of forcibly retracting to approximately its original size and shape after the load is removed. Typical rubbers which can be used in this invention include for example, crude india rubber, reclaimed rubber, ground scrap, balata, gutta percha, chlor butadiene polymers, butadiene polymers and copolymers which include such well known materials as Perbunan, Hycar, Buna S and Buna N, guayule, chicle, gutta-siak, juletong or pontianac, caucho, kickxia and manihot rubbers, olefine polysulfide plastics, 2,3-dimethyl butadiene polymers, 2-phenyl butadiene polymers, dichlor butadiene polymers, mono- and di-olefine copolymers and the like whether or not admixed with fillers, pigments, accelerating or vulcanizing agents or other compounding ingredients.

Neutral retene oil can be used in place of technical retene with very similar results and is substantially equivalent thereto. Mixtures of neutral retene oil with rosin are also useful. Valuable products were obtained from chlorinated retene and from chlorinated paraffin wax which apparently enters into chemical combination with the rubber or phosphine halide or both.

Again this invention is not limited to the specific examples and compositions set forth to illustrate the invention. Other solvents and other organic phosphine halides whether the pure compounds, mixtures thereof or the "crude" or "stripped" varieties and whether in the presence or absence of a Friedel-Crafts catalyst may be used in the preparation of the preferred materials as well as other means of effecting the reactions. In addition other Friedel-Crafts catalysts such as ferric chloride and stannic chloride may be employed. Other fillers, compounding and vulcanizing ingredients than those specifically mentioned may be utilized. Furthermore, the new products of this invention can be admixed with other plastic or resinous materials. This invention is limited solely by the claims attached hereto as part of the present specification.

What is claimed is:

1. A new composition of matter comprising a modified product of the action of an organic phosphine halide on a rubber obtained by intimately mixing a rubber with substantially an equal proportion by weight of technical tolyl dichlor phosphine consisting of the crude reaction product containing the catalyst complex of toluene and $PCl_3$ in the presence of aluminum chloride catalyst and effecting a modification of the product by having intimately incorporated in the mixture technical retene substantially equal to the weight of the rubber and heating the mixture in the presence of the retene.

2. A new composition of matter comprising a modified product of the action of an organic phosphine halide on a rubber obtained by intimately mixing india rubber with substantially an equal proportion by weight of technical tolyl dichlor phosphine consisting of the crude reaction product containing the catalyst complex of toluene and $PCl_3$ in the presence of aluminum chloride catalyst and effecting a modification of the product by having intimately incorporated in the mixture technical retene substantially equal to the weight of the rubber and heating the mixture in the presence of the retene.

3. A new composition of matter comprising a modified product of the action of an organic phosphine halide on a rubber obtained by intimately mixing reclaimed rubber with substantially an equal proportion by weight of technical tolyl dichlor phosphine consisting of the crude reaction product containing the catalyst complex of toluene and $PCl_3$ in the presence of aluminum chloride catalyst and effecting a modification of the product by having intimately incorporated in the mixture technical retene substantially equal to the weight of the rubber and heating the mixture in the presence of the retene.

4. A new composition of matter comprising a modified product of the action of an organic phosphine halide on a rubber obtained by intimately mixing guayule with substantially an equal proportion by weight of technical tolyl dichlor phosphine consisting of the crude reaction product containing the catalyst complex of toluene and $PCl_3$ in the presence of aluminum chloride catalyst and effecting a modification of the product by having intimately incorporated in the mixture technical retene substantially equal to the weight of the rubber and heating the mixture in the presence of the retene.

5. A new composition of matter comprising a modified product of the action of an organic phosphine halide on a rubber obtained by intimately mixing pale crepe rubber with substantially an equal proportion by weight of technical tolyl dichlor phosphine consisting of the crude reaction product containing the catalyst complex of toluene and $PCl_3$ in the presence of aluminum chloride catalyst and effecting a modification of the product by having intimately incorporated in the mixture technical retene substantially equal to the weight of the rubber and heating the mixture in the presence of the retene.

6. The method of making a modified product of the action of an organic phosphine halide on a rubber which comprises intimately mixing a rubber with substantially an equal proportion by weight of technical tolyl dichlor phosphine consisting of the crude reaction product containing the catalyst complex of toluene and $PCl_3$ in the presence of aluminum chloride catalyst and effecting a modification of the product by having intimately incorporated in the mixture technical retene substantially equal to the weight of the rubber and heating the mixture in the presence of the retene.

7. The method of making a modified product of the action of an organic phosphine halide on a rubber which comprises intimately mixing india rubber with substantially an equal proportion by weight of technical tolyl dichlor phosphine consisting of the crude reaction product containing the catalyst complex of toluene and $PCl_3$ in the presence of aluminum chloride catalyst and effecting a modification of the product by having intimately incorporated in the mixture technical retene substantially equal to the weight of the rubber and heating the mixture in the presence of the retene.

8. The method of making a modified product of the action of an organic phosphine halide on a rubber which comprises intimately mixing india rubber with substantially an equal proportion by weight of technical tolyl dichlor phosphine consisting of the crude reaction product containing the catalyst complex of toluene and $PCl_3$ in the presence of aluminum chloride catalyst and effecting a modification of the product by having intimately incorporated in the mixture technical retene substantially equal to the weight of the rubber and heating the mixture in the presence of the retene.

9. The method of making a modified product of the action of an organic phosphine halide on a rubber which comprises intimately mixing guayule with substantially an equal proportion by weight of technical tolyl dichlor phosphine consisting of the crude reaction product containing the catalyst complex of toluene and $PCl_3$ in the presence of aluminum chloride catalyst and effecting a modification of the product by having intimately incorporated in the mixture technical retene substantially equal to the weight of the rubber and heating the mixture in the presence of the retene.

10. The method of making a modified product of the action of an organic phosphine halide on a rubber which comprises intimately mixing pale crepe rubber with substantially an equal proportion by weight of technical tolyl dichlor phosphine consisting of the crude reaction product containing the catalyst complex of toluene and $PCl_3$ in the presence of aluminum chloride catalyst and effecting a modification of the product by having intimately incorporated in the mixture technical retene substantially equal to the weight of the rubber and heating the mixture in the presence of the retene.

11. An elastic rubber like sulfur vulcanizable derivative of a rubber which is resistant to cracking in ozone, has low absorptive capacity in lubricating oil, gasoline and other solvents which ordinarily swell rubber and are absorbed thereby, the properties being greatly improved over those of the original rubber in both ozone and solvents, said rubber derivative consisting of the product obtained by intimately mixing the rubber with an aryl phosphine dihalide of the structure aryl

where $x$ and $y$ are halogen and a polynuclear aromatic hydrocarbon substantially equal to the proportion by weight of the rubber and heating the mixture in the presence of aluminum chloride.

12. An elastic rubber like sulfur vulcanizable derivative of a natural rubber which is resistant to cracking in ozone, has low absorptive capacity in lubricating oil, gasoline and other solvents which ordinarily swell rubber and are absorbed thereby, the properties being greatly improved over those of the original rubber in both ozone and solvents said rubber derivative consisting of the product obtained by intimately mixing the rubber with an aryl phosphine dihalide of the structure aryl

where $x$ and $y$ are halogen and a polynuclear aromatic hydrocarbon substantially equal to the proportion by weight of the rubber and heating the mixture in the presence of aluminum chloride.

13. A new composition of matter comprising a modified product of the action of an organic phosphine halide on a rubber obtained by intimately mixing a rubber with an organic phosphine halide having at least one organic radical and at least one halogen atom directly attached to a trivalent phosphorus atom and effecting a modification of the product by having intimately incorporated in the mixture an aromatic polynuclear hydrocarbon at least in equal proportion of the weight of the rubber but not more than twice the weight of the rubber and heating the mixture in the presence of the modifying agent.

14. A new composition of matter comprising a modified product of the action of an aryl phosphine halide on a rubber obtained by intimately mixing a rubber with an aryl phosphine halide having at least one aryl radical and at least one halogen atom directly attached to a trivalent phosphorus atom and effecting a modification of the product by having intimately incorporated in the mixture an aromatic polynuclear hydrocarbon at least in equal proportion of the weight of the rubber but not more than twice the weight of the rubber and heating the mixture in the presence of the modifying agent.

15. A new composition of matter comprising a modified product of the action of an aryl phosphine halide on a rubber obtained by intimately mixing a rubber with an aryl phosphine halide of the structure

where R is an aryl radical, $x$ and $y$ are halogen and effecting a modification of the product by having intimately incorporated in the mixture an aromatic polynuclear hydrocarbon in substantially equal proportion of the weight of the rubber and heating the mixture in the presence of the modifying agent.

16. A new composition of matter comprising a modified product of the action of an aryl phosphine halide on a natural rubber obtained by initmately mixing a natural rubber with an aryl phosphine halide of the structure

where R is an aryl radical, $x$ and $y$ are halogen and effecting a modification of the product by having intimately incorporated in the mixture an aromatic polynuclear hydrocarbon in substantially equal proportion of the weight of the rubber and heating the mixture in the presence of the modifying agent.

17. A new composition of matter comprising a modified product of the action of an aryl phosphine halide on reclaimed rubber obtained by intimately mixing reclaimed rubber with an aryl phosphine halide of the structure

where R is an aryl radical, $x$ and $y$ are halogen and effecting a modification of the product by having intimately incorporated in the mixture an aromatic polynuclear hydrocarbon in substantially equal proportion of the weight of the rubber and heating the mixture in the presence of the modifying agent.

18. A new composition of matter comprising a modified product of the action of an aryl phosphine halide on a rubber obtained by intimately mixing substantially equal proportions by weight each of a rubber, an aryl phosphine chloride of the structure $$R-P\begin{array}{c}Cl\\ \diagdown\\ Cl\end{array}$$

where R is an aryl radical and a polynuclear aromatic hydrocarbon and heating the mixture.

19. A new composition of matter comprising a modified product of the action of an aryl phosphine halide on a rubber obtained by intimately mixing a rubber with a technical aryl phosphine chloride having at least one aryl radical and at least one chlorine atom attached directly to a trivalent phosphorus atom and consisting of the crude reaction product containing the catalyst complex of an aromatic hydrocarbon and PCl₃ in the presence of aluminum chloride catalyst and effecting a modification of the product by having intimately incorporated in the mixture a polynuclear aromatic hydrocarbon in substantially equal proportion by weight of the rubber and heating the mixture.

20. A new composition of matter comprising a modified product of the action of an aryl phosphine halide on india rubber obtained by intimately mixing india rubber with substantially an equal proportion by weight of a technical aryl phosphine chloride having at least one aryl radical and at least one chlorine atom attached directly to a trivalent phosphorus atom and consisting of the crude reaction product containing the catalyst complex of an aromatic hydrocarbon and PCl₃ in the presence of aluminum chloride catalyst and effecting a modification of the product by having intimately incorporated in the mixture retene in a proportion substantially equal to that of the rubber and heating the mixture.

21. The method of making a modified product of the action of an organic phosphine halide on a rubber which comprises intimately mixing a rubber with an organic phosphine halide having at least one organic radical and at least one halogen atom directly attached to a trivalent phosphorus atom and effecting a modification of the product by having intimately incorporated in the mixture an aromatic polynuclear hydrocarbon at least in equal proportion of the weight of the rubber but not more than twice the weight of the rubber and heating the mixture in the presence of the modifying agent.

22. The method of making a modified product of the action of an aryl phosphine halide on a rubber which comprises intimately mixing a rubber with an aryl phosphine halide having at least one aryl radical and at least one halogen atom directly attached to a trivalent phosphorus atom and effecting a modification of the product by having intimately incorporated in the mixture an aromatic polynuclear hydrocarbon at least in equal proportion of the weight of the rubber but not more than twice the weight of the rubber and heating the mixture in the presence of the modifying agent.

23. The method of making a modified product of the action of an aryl phosphine halide on a rubber which comprises intimately mixing a rubber with an aryl phosphine halide of the structure

where R is an aryl radical, x and y are halogen and effecting a modification of the product by having intimately incorporated in the mixture an aromatic polynuclear hydrocarbon in substantially equal proportion of the weight of the rubber and heating the mixture in the presence of the modifying agent.

24. The method of making a modified product of the action of an aryl phosphine halide on a natural rubber which comprises intimately mixing a natural rubber with an aryl phosphine halide of the structure

where R is an aryl radical, x and y are halogen and effecting a modification of the product by having intimately incorporated in the mixture an aromatic polynuclear hydrocarbon in substantially equal proportion of the weight of the rubber and heating the mixture in the presence of the modifying agent.

25. The method of making a modified product of the action of an aryl phosphine halide on reclaimed rubber which comprises intimately mixing reclaimed rubber with an aryl phosphine halide of the structure

where R is an aryl radical, x and y are halogen and effecting a modification of the product by having intimately incorporated in the mixture an aromatic polynuclear hydrocarbon in substantially equal proportion of the weight of the rubber and heating the mixture in the presence of the modifying agent.

26. The method of making a modified product of the action of an aryl phosphine halide on a rubber which comprises intimately mixing substantially equal proportions by weight each of a rubber, an aryl phosphine chloride of the structure

where R is an aryl radical and a condensed polynuclear aromatic hydrocarbon and heating the mixture.

27. The method of making a modified product of the action of an aryl phosphine halide on a rubber which comprises intimately mixing a rubber with a technical aryl phosphine chloride having at least one aryl radical and at least one chlorine atom attached directly to a trivalent phosphorus atom and consisting of the crude reaction product containing the catalyst complex of an aromatic hydrocarbon and PCl₃ in the presence of aluminum chloride catalyst and effecting a modification of the product by having intimately incorporated in the mixture a polynuclear aromatic hydrocarbon in substantially equal proportion by weight of the rubber and heating the mixture.

28. The method of making a modified product of the action of an aryl phosphine halide on india rubber which comprises intimately mixing india rubber with substantially an equal proportion by weight of a technical aryl phosphine chloride having at least one aryl radical and at least one chlorine atom attached directly to a trivalent phosphorus atom and consisting of the crude reaction product containing the catalyst complex of an aromatic hydrocarbon and PCl₃ in the presence of aluminum chloride catalyst and effecting a modification of the product by having intimately incorporated in the mixture retene in a proportion substantially equal to that of the rubber and heating the mixture.

GEORGE D. MARTIN.